(12) United States Patent
Nair et al.

(10) Patent No.: US 10,291,681 B2
(45) Date of Patent: May 14, 2019

(54) DIRECTORY LIMIT BASED SYSTEM AND METHOD FOR STORING MEDIA SEGMENTS

(71) Applicant: Ericsson AB, Stockholm (SE)

(72) Inventors: Raj Nair, Lexington, MA (US); Prabhudev Navali, Westford, MA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 15/183,122

(22) Filed: Jun. 15, 2016

(65) Prior Publication Data

US 2017/0026447 A1    Jan. 26, 2017

Related U.S. Application Data

(60) Provisional application No. 62/181,503, filed on Jun. 18, 2015.

(51) Int. Cl.
| | | |
|---|---|---|
| *H04L 29/06* | (2006.01) | |
| *H04N 21/2343* | (2011.01) | |
| *H04N 21/262* | (2011.01) | |
| *H04N 21/658* | (2011.01) | |
| *H04N 21/845* | (2011.01) | |
| *H04L 29/08* | (2006.01) | |
| *H04N 21/222* | (2011.01) | |
| *H04N 21/2387* | (2011.01) | |
| *H04N 21/472* | (2011.01) | |

(Continued)

(52) U.S. Cl.
CPC ........ *H04L 65/608* (2013.01); *H04L 65/4084* (2013.01); *H04L 65/601* (2013.01); *H04L 65/604* (2013.01); *H04L 67/02* (2013.01); *H04N 21/2223* (2013.01); *H04N 21/2387* (2013.01); *H04N 21/23439* (2013.01); *H04N 21/2662* (2013.01); *H04N 21/26258* (2013.01); *H04N 21/278* (2013.01); *H04N 21/47202* (2013.01); *H04N 21/6581* (2013.01); *H04N 21/845* (2013.01); *H04N 21/8456* (2013.01); *H04N 21/4147* (2013.01); *H04N 21/8586* (2013.01)

(58) Field of Classification Search
CPC ... H04L 65/608; H04L 65/604; H04L 65/601; H04L 67/02; H04L 65/4084; H04N 21/2662; H04N 21/278; H04N 21/845; H04N 21/2223; H04N 21/2387; H04N 21/47202; H04N 21/26258; H04N 21/8456; H04N 21/6581; H04N 21/23439
See application file for complete search history.

(56) References Cited

U.S. PATENT DOCUMENTS

2011/0016275 A1* 1/2011 Lemonnier ......... G06F 12/0238
                                                          711/115
2012/0259946 A1  10/2012 Stockhammer et al.
(Continued)

FOREIGN PATENT DOCUMENTS

| KR | 20140004218 A | 1/2014 |
| TW | 201043021 A1 | 1/2010 |

*Primary Examiner* — Michael A Keller

(57) ABSTRACT

A system and method for facilitating directory limit based storage scheme for uploading media segments in multiple directories at one or more media servers. Directory limit parametric information may be signaled in an MPD document for enabling a DASH client device to construct URLs based on the received directory parametric information via a modified/extended SegmentTemplate element of the MPD document.

22 Claims, 7 Drawing Sheets

(51) Int. Cl.
*H04N 21/2662* (2011.01)
*H04N 21/278* (2011.01)
H04N 21/4147 (2011.01)
H04N 21/858 (2011.01)

(56) References Cited

U.S. PATENT DOCUMENTS

| | | | |
|---|---|---|---|
| 2013/0103911 A1* | 4/2013 | Bulut | G06F 12/0866 |
| | | | 711/144 |
| 2014/0095672 A1 | 4/2014 | Xu et al. | |
| 2014/0189066 A1* | 7/2014 | Gholmieh | H04L 67/02 |
| | | | 709/219 |
| 2014/0199044 A1 | 7/2014 | Gupta et al. | |
| 2014/0201335 A1 | 7/2014 | Wang | |
| 2014/0229976 A1 | 8/2014 | Ma et al. | |
| 2014/0230003 A1* | 8/2014 | Ma | H04N 21/231 |
| | | | 725/115 |
| 2016/0127440 A1* | 5/2016 | Gordon | H04N 21/23439 |
| | | | 709/219 |
| 2016/0255131 A1* | 9/2016 | Bulava | H04L 65/605 |
| | | | 709/219 |
| 2016/0366488 A1* | 12/2016 | Long | H04N 21/6125 |
| 2016/0366617 A1* | 12/2016 | Chen | H04L 43/16 |

* cited by examiner

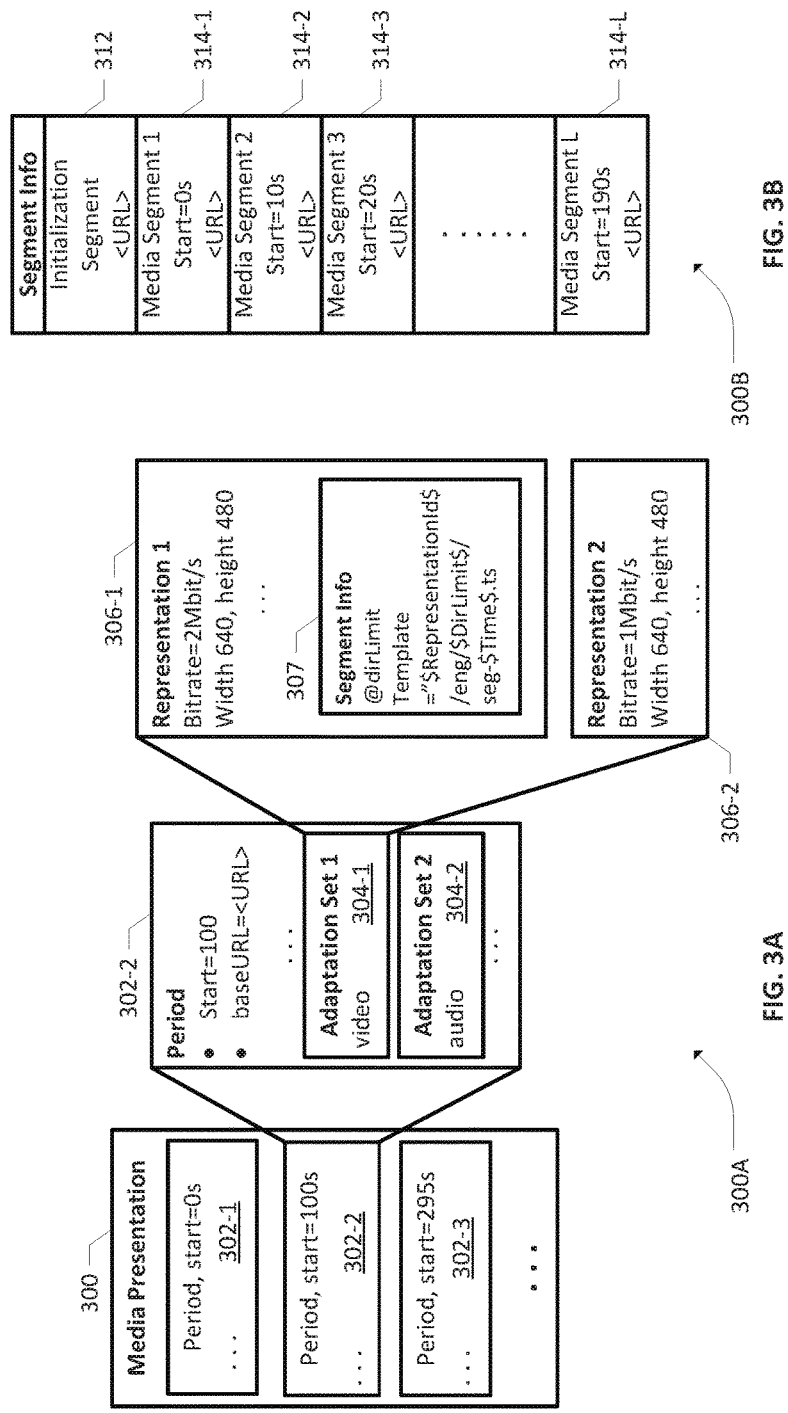

DIRECTORY LIMIT BASED SYSTEM AND METHOD FOR STORING MEDIA SEGMENTS

PRIORITY UNDER 35 U.S.C. § 119(e) & 37 C.F.R. § 1.78

This nonprovisional application claims priority based upon the following prior U.S. provisional patent application(s): (i) "DIRECTORY LIMIT BASED SYSTEM AND METHOD FOR STORING MEDIA SEGMENTS," Application No. 62/181,503, filed Jun. 18, 2015, in the name(s) of Raj Nair and Prabhudev Navali; each of which is hereby incorporated by reference in its entirety.

FIELD OF THE DISCLOSURE

The present disclosure generally relates to communication networks. More particularly, and not by way of any limitation, the present disclosure is directed to a system and method for facilitating directory limit based storage of media segments operative for adaptive bitrate (ABR) streaming.

BACKGROUND

Adaptive streaming based on HyperText Transfer Protocol (HTTP) has become a popular approach for delivering multimedia content over the Internet. Typical streaming implementations use a "client-controlled" methodology in which the client requests media segments from the server at an appropriate time, wherein data transfer takes place over HTTP, which media segments are processed and rendered by the client. Broadly, these technologies operate by breaking the content (live, on-demand, time-shifted content, etc.) into a sequence of small HTTP-based file segments, each segment containing a short interval of playback time of content that is potentially many hours in duration, such as a movie or the live broadcast of a sports event, for instance. The content is made available at a variety of different bitrates, i.e., alternative segments encoded at different bitrates covering aligned short intervals of play back time are made available. While the content is being played back by an adaptive streaming client or application, the client automatically selects from the alternative bitrates the next segment to download and play back based on current network conditions. Typically, the client selects the segment with the highest bit rate possible that can be downloaded in time for play back without causing stalls or re-buffering events in the playback. Thus, an adaptive streaming client can seamlessly adapt to changing network conditions, and provide high quality play back with fewer stalls or re-buffering events.

Although the ABR technologies have made several strides in the recent years, many lacunae continue to exist, e.g., especially in terms of the ever-increasing need for better storage management for media content.

SUMMARY

The present patent disclosure is broadly directed to systems, methods, apparatuses, devices, and associated non-transitory computer-readable media for facilitating a directory limit based media segment storage scheme and delivery of such media segments in an ABR streaming network. In one aspect, an embodiment of a method operating at an ABR packager node is disclosed. The claimed embodiment comprises, inter alia, configuring suitable directory limit parametric information in a packager upload profile to facilitate storage of media segments of a content program across multiple directories of a media server's file system. One or more media presentation description documents (MPDs) may be generated with respect to the media segments of the content program stored at the media server, which are adapted for signaling the directory limit parametric information to a Dynamic Adaptive Streaming over HTTP (DASH) client device via the MPDs. The MPDs are configured with a segment template element that is extended or otherwise modified to identify the directory limit parametric information in order to enable the DASH client device to construct fully qualified resource locators (e.g., URLs) based on the directory limit parametric information for accessing the media segments at the media server. In an example implementation, the directory limit parametric information may comprise a new @dirLimit attribute and a new $DirLimit$ identifier that may be signaled via one or more attributes, elements, parameters, or other components associated with the segment template element of the MPD as an advancement over the MPEG-DASH specification ISO/IEC 23009-1, titled "Part 1: Media presentation description and segment formats", incorporated by reference herein.

In another aspect, an embodiment of an ABR package node, element or system is disclosed that includes, inter alia, one or more processors and one or more persistent memories coupled to the one or more processors and a network interface for receiving media from one or more sources. Suitable program instructions may be stored in one or more persistent memories coupled to the processors for executing thereon. When executed by the processors, the program instructions are operative for performing the following: configuring directory limit parametric information for facilitating storage of media segments of a content program across multiple directories of a media server's file system; generating one or more MPDs with respect to the media segments of the content program stored at the media server; and sending or otherwise facilitating transmission of the directory limit parametric information to a DASH client device via the MPDs that have been extended otherwise modified as set forth herein.

In yet another aspect, an embodiment of a method operating at a user equipment (UE) device configured to engage in ABR streaming session via DASH is disclosed. The claimed embodiment comprises, inter alia, receiving one or more MPDs with respect to a content program, each MPD having a segment template element that identifies one or more directory limit indicia, and parsing the segment template element of the one or more MPDs. Media resource locators such as, e.g., URLs, are constructed based on the one or more directory limit indicia provided in the MPD, preferably using a number-based substitution scheme or a time-based substitution scheme. The method may also involve generating appropriate HTTP requests using the constructed resource locators to obtain media segments of the content program from a media server.

In a still further aspect, an embodiment of a method operating at an ABR packager node for providing scalable storage for media segments is disclosed. The claimed embodiment comprises, inter alia, configuring directory limit parametric information operative to specify a maximum number of media segments that can be stored in a directory of a file system associated with a media server and segmenting a content program into a plurality of media segments. The method further involves constructing resource locators based on the directory limit parametric information for storing the media segments across a variable number of directories associated with the media server and storing the media segments at storage locations referenced by the resource locators across the directories of the media server. The method may also comprise generating suitable metadata files and/or playlist files for the content program in accordance with one or more ABR streaming protocols or technologies (e.g., HLS protocol, HDS protocol, Smooth Streaming protocol and DASH protocol, etc.), wherein the metadata files contain one or more segment lists and specific resource locators that explicitly reference the media segments identified in the one or more segment lists.

In still further aspects, one or more embodiments of a non-transitory computer-readable medium containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed in the dependent claims.

Advantages of the present invention include, but not limited to, the ability to provide a scalable multi-directory storage architecture for media servers that can be configurably adapted to store various types of "long duration" content such as time-shifted live programs, VOD, network video storage assets, and the like, preferably consistent with various storage/operator administration policies, content provider policies, etc. As will be seen below, by signaling the directory limit information in an MPD's segment template in an efficient manner, client devices can be advantageously configured to construct suitable URLs required for accessing the media segments stored across multiple directories. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 3A is an example media presentation description document (MPD) having a segment template element with suitable directory size signaling that includes directory limit parametric information according to an embodiment of the present invention;

FIG. 3B is an example segment information list having media resource locators (e.g., URLs) constructed by a DASH client based on the directory limit parametric information according to an embodiment of the present invention;

DETAILED DESCRIPTION OF THE DRAWINGS

Figure 1:
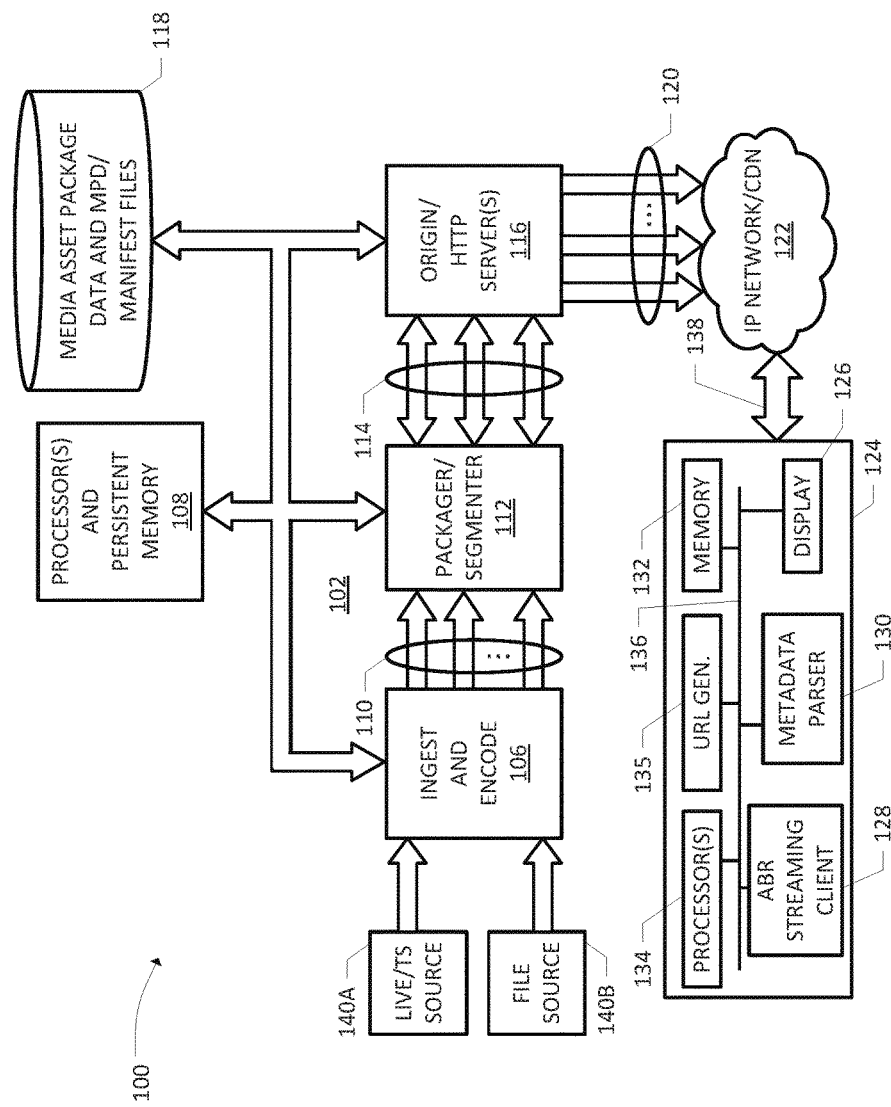
FIG. 1 depicts an example ABR network environment wherein one or more embodiments of the present patent application may be practiced for facilitating multi-directory storage of media segments and transmission of suitable metadata files with directory size signaling.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. In still further arrangements, one or more network elements may be disposed in a cloud-based platform or datacenter having suitable equipment running virtualized functions or applications. Accordingly, at least some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, advertisement push policy management, and the like), in addition to providing support for multiple application services (e.g., data and multimedia applications). Subscriber end stations or client devices may comprise any device configured to execute, inter alia, a streaming client application (e.g., an ABR streaming client application) for receiving live or stored media content from one or more content providers via one or more networks based on a variety of access technologies, standards and protocols. Such client devices may therefore include TVs, set-top boxes (STBs), DVR/PVR players, portable laptops, netbooks, palm tops, tablets, mobile phones, smartphones, multimedia/video phones, mobile/wireless user equipment, portable media players, portable gaming systems or consoles (such as the Wii®, Play Station 3®, etc.) and the like that may access or consume live/stored media content/services provided over a delivery network or a combination of networks for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example ABR network environment 100 wherein one or more embodiments of the present patent application may be practiced for facilitating multi-directory storage of media segments and transmission of suitable metadata files with directory size signaling to ABR client devices. As illustrated, example ABR streaming network environment 100 includes an IP network and/or an overlay content delivery network or content distribution network (CDN) 122 coupled to an adaptive streaming server system or infrastructure 102 including network elements configured to provide, inter alia, media ingestion and preparation, packaging, media storage, etc. In one aspect, CDN 122 may comprise a delivery architecture over a public or private packet-switched network implemented for high-performance streaming of a variety of digital assets or program assets as well as services (hereinafter referred to as "media content"), including live media programming, time-shifted content, catch-up assets, network-stored subscriber content (e.g., network personal video recorder (NPVR) or network digital video recorder (NDVR) assets) and/or on-demand content such as VOD, and the like, using HTTP. In general, the terms "media content" or "content program" (or, simply "content") as used in reference to at least some embodiments of the present patent disclosure may therefore include digital assets or program assets such as any type of audio/video content that may comprise live capture media or on-demand media, e.g., over-the-air free network television (TV) shows or programs, pay TV broadcast programs via cable networks or satellite networks, free-to-air satellite TV shows, IPTV programs, Over-The-Top (OTT) and video-on-demand (VOD) or movie-on-demand (MOD) shows or programs, time-shifted TV (TSTV) content, etc. It will be appreciated by one of ordinary skill in the art that although the embodiments of the present disclosure are particularly advantageous in the context of DASH-based ABR media streaming, the teachings herein are not necessarily limited thereto and, accordingly, one or more techniques set forth herein may also be equally applied in other streaming environments, mutatis mutandis.

By way of illustration, content may be delivered via IP/CDN 122 using adaptive bitrate (ABR) streaming techniques compliant with specifications such as, e.g., MPEG-DASH, Microsoft® Silverlight® Smooth Streaming, HTTP Live Streaming (HLS), HTTP Dynamic Streaming (HDS), Icecast, and so on, to one or more subscriber end stations disposed in the streaming environment 100, as illustrated by an example client device or user equipment (UE) device 124. It will be apparent that one or more such client devices may be associated with a subscriber/customer for consuming content delivered via CDN 122 in any type or number of access technologies including broadband access via wired and/or wireless (radio) communications. For purposes of the present patent application, the terms "streaming client device", "client device", "ABR client device" or terms of similar import may be used somewhat synonymously and may comprise any UE device or appliance that in one implementation not only receives program assets for live viewing, playback and/or decoding the content, but also operates as a command console or terminal that can accept user inputs, messages, commands or requests to interact with a network element disposed in CDN 122 and/or the associated streaming server systems for controlling transmission of content via a bidirectional interface. Also, in some embodiments, client device 124 may specifically refer to a DASH-compliant UE device, depending on the context. As such, the example client device 124 may include one or more streaming client modules 128 (e.g., an ABR streaming client) operative with one or more ABR technologies as well as associated decoding functionalities depending on the streaming technologies implemented (e.g., MPEG-DASH). A parser module 130 is operative to parse metadata files and effectuate construction of URLs for segments stored in multiple directories at a server, as will be set forth in detail further below. The streaming client module(s) 128 and the parser module 130 are operably coupled to a processor module 134 and video buffer memory 132 via a suitable bus structure 136 for effectuating acquisition, decoding and rendering of the streamed media content, e.g., at a display 126. Although not specifically shown, the client device 124 also includes appropriate user interfaces for viewing one or more electronic program guides that list, identify or otherwise show various streaming channels (live media/TS/on-demand) the subscriber is able to receive. Such user interfaces may also be configured to allow the user to scroll through an electronic program guide (i.e., channel surfing), select or otherwise change a particular streaming channel, and the like. Further, as will be described in additional detail hereinbelow, example client device 124 may also include appropriate structures and modules operating in conjunction with parser 130 and URL generation module 135 for facilitating retrieval of media segments from the server system 102 via an interface 138 to the delivery network infrastructure.

As noted above, the example adaptive streaming server system 102 may be configured to accept various types of media content, e.g., live programming, time-shifted (TS) assets, on-demand/NPVR assets, etc., as exemplified by live/TS sources 104A and/or static file sources 104B. Media content from live sources 104A may comprise live programming captured relative to any type of event, e.g., sporting/entertainment/gaming events, concerts, live TV shows, live news broadcasting, etc. An ingest/encode block 106 is operative to receive input media streams from the media sources and may employ a variety of source video codecs, e.g., H.264, MPEG varieties, High Efficiency Video Coding or HEVC (H.265), and the like, depending on implementation. Where an input media stream is already encoded or compressed, block 106 may be configured to operate as a transcoder so that one or more ABR representations of the media content at suitable bitrates may be generated. In general operation, the example streaming server system 102 may be configured, under the control of one or more processors 108 executing appropriate program code stored in associated persistent memory, to effectuate adaptive streaming of content as follows. Initially, source media content may be transcoded or otherwise encoded with different bit rates (e.g., multi-rate transcoding) using applicable encoder(s) 106. For example, content of a particular program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions" or "formats", wherein each bitrate is called a profile or representation. Reference numeral 110 refers to a collection of media streams encoded at different bitrates by the encoder 106. A segmentation/packager node 112 is operative to divide each version of the encoded media content into fixed duration segments or chunks, which are typically between two and ten seconds in duration, thereby generating a plurality of chunk streams or segment streams 114. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more Origin/HTTP servers 116 are operative to receive or otherwise uploaded with the encoded media segment streams 114 as well as associated manifest files, which may be stored at one or more databases or storage file systems 118 for facilitating delivery of the media to the requesting clients 124 via IP/CDN 122, illustrated as adaptive streams 120. As will be set forth in detail below, an example file system associated with the media server(s) 116 may comprise a directory tree structure that maps to one or more physical storage structures or schemes, one or more virtual storage structures or schemes, or a combination of storage schemes and/or structures, based on a suitable URL construction mechanism.

In accordance with an embodiment of the present invention, appropriate directory limit parametric information may be configured with/for the operation of the packager node 112 to facilitate scalable storage of media segments at an HTTP/origin server of the ABR streaming network environment 100, e.g., HTTP/origin sever or media server 116, where the media segments of a content program are so numerous as to require storage across multiple directories of a storage file system associated with the media server. By way of illustration, consider a "long-duration" asset which could be a VOD asset, or a live program converted to a catch-up asset via time-shifting, or an NPVR asset, e.g., a 9-hour asset, that has been segmented with a 2-second segment duration, for storage at a server file system having a directory limit of 1000. As such, this asset may result in 16,200 segments ([9 hrs.×60 min.×60 sec.]/2 sec.]. With a server directory limit of 1000 files per directory on the server, this asset would therefore require 162 directories to store the segments. As there can be variable directory limits, thus requiring a variable number of file directories, (e.g., depending on storage administration policies, content provider policies, sizes of content programs, etc.), a configurably scalable storage scheme is required in such scenarios. Accordingly, in one embodiment, program instructions stored in persistent memory 108 associated with the packager node 112 may be configured to provide, obtain and/or execute suitable directory limit parametric information operative to specify a maximum number of media segments that can be stored in a directory of a file system associated with a media server, which directory limit parametric information may be used in constructing resource locators, e.g., URLs, for storing or uploading the media segments at locations referenced by the URLs across scalably variable number of directories of the media server's file system. In one variation, the packager node 112 may be configured to generate metadata files for the content program in accordance with an ABR streaming protocol (e.g., MPEG-DASH (where explicit or direct referencing is provided via a SegmentList element), HLS, HDS, Smooth Streaming, etc.), wherein the metadata files may contain one or more segment lists and specific fully-qualified URLs associated with the media segments referenced or otherwise identified in the segment lists. In a further variation, the packager node 112 may be configured to generate DASH-specific MPD documents that include a SegmentTemplate element that is suitably modified and/or extended so as to enable signaling of the directory limit parametric information to recipient DASH client devices, whereby the DASH client devices may be enabled and/or configured to construct fully qualified resource locators based on the received directory limit parametrics for accessing the media segments stored in multiple directories associated with the server.

To concretize the foregoing teachings in accordance with embodiments of the present invention, the following discussion is provided with respect to the MPEG-DASH specification ISO/IEC 23009-1 (hereinafter referred to as the "DASH specification"), incorporated by reference herein, wherein example implementations of suitable directory limit configurations for storage URL construction and/or segment template signaling are particularly set forth.

As is known in the art, DASH specifies an XML MPD document that enables delivery of media content using standard HTTP servers. The media content is delivered as segments and the segments are typically encoded media data with additional metadata, as described hereinabove with respect to an example ABR streaming environment 100. The segments are typically served from HTTP servers (CDN origin and/or cache servers, broadly referred to herein as media servers), which may be located at various levels in a hierarchically organized network infrastructure. The media servers are configured to store the segments in associated file directories, which may be provided as virtualized storage resources, e.g., cloud-based storage platforms or services, in some implementations. In general operation, a DASH client device is operative to obtain MPD(s) and segments from the HTTP servers pursuant to an ABR streaming media session for consuming content.

Reference is now taken to FIG. 3A which illustrates an example MPD having a segment template element with suitable directory limit parametric information according to an embodiment of the present invention. Reference numeral 300A refers to an example MPD data structure model that is illustrative of hierarchical organization of the metadata relative to different media segments of a particular content. In general, MPD model 300A includes a top-level Media Presentation structure or element 300 that contains one or more periods, e.g., periods 302-1 to 302-3, that may be ordered in ascending chronological order (i.e., increasing in time) with a start time and associated time duration. Each period (e.g., period 302-2) includes one or one or more adaptation sets for different asset components, each adaptation set comprising one or more representations. Representations in the same adaptation set are alternatives to each other and typically contain different encoded versions of the same source media content and may include parameters such as language, media component type, picture aspect ratio, accessibility, etc. as well as information regarding the configurable directory limit parametric information that will be described in additional detail further below. As illustrated, reference numerals 304-1 and 304-2 respectively refer to a video adaptation set and an audio adaptation set of period 302-2. The video adaptation set 304-1 in turn includes two representations 306-1 and 306-2, each having respective bitrates, display resolutions, etc, in addition to the segment metadata information provided in a SegmentTemplate element 307 that contains a @dirLimit attribute and a $DirLimit$ identifier in an example implementation that may be used in constructing URLs in accordance with the teachings herein.

One skilled in the art will recognize that representations are assigned with Segment Information through the presence of the elements BaseURL, SegmentBase, SegmentTemplate and/or SegmentList, wherein the segment information provides the location and availability information for all the segments in one Representation. These elements may be present in the Period and AdaptationSet elements in a hierarchical manner as noted above. If these elements are defined in multiple levels, then one on the lower levels takes precedence over the higher level values. According to the DASH specification, each Representation may have only one assigned method to specify Segment Information. The main methods to specify the Segment Information are as follows: (a) via one or more SegmentList elements; or (b) a SegmentTemplate element. A segment template that is applicable for a group of media segments in a Representation is defined by the SegmentTemplate element (or interchangeably a "segment template" element), wherein the specific identifiers in the template are substituted by dynamic values to create segment URLs. The substitution rules are specified in the DASH specification at 5.3.9.4.2, incorporated by reference herein.

Those skilled in the art will appreciate that SegmentTemplate provides an efficient way to specify the Segment Information, as it requires less frequent updates to an MPD and less frequent downloads of the MPD by the DASH Client, in addition to taking a smaller amount of metadata information to be transmitted than is required for sending explicitly or directly referenced segments in a SegmentList. With respect to template-based Segment URL construction, it should be noted that the following elements:
SegmentTemplate@media;
SegmentTemplate@index;
SegmentTemplate@initialization; and
SegmentTemplate@bitstreamSwitching,
of the SegmentTemplate element each contain a string that may contain one more identifiers as listed in Table 16 of the DASH specification. The Segment URL may be constructed by substituting identifiers with substitution parameters in the manner defined in the same Table 16 of the DASH specification. The MPD is authored such that the application of the substitution parameters for identifiers in the template results in valid Segment URL.

One of the main identifiers provided in the SegmentTemplate element is $Number$ identifier, which may be used in constructing a URL as follows. If the Representation contains or inherits a SegmentTemplate element that contains $Number$ identifier, then the Segment URL for the Media Segment at position k in the Representation may be determined by replacing the $Number$ identifier by (k−1)+@startNumber, where Kstart is value of the @startNumber attribute in the MPD. Another identifier provided in the SegmentTemplate element that may be used for URL construction is the $Time$ identifier. If the Representation contains or inherits a SegmentTemplate element that contains the $Time$ identifier, then the Segment URL for the Media Segment at position k in the Representation may be determined by replacing the $Time$ identifier by ((K−1)+(Kstart−1))*@duration, where @startNumber is an attribute in the MPD.

One of the drawbacks with respect to media storage at a server is that when a SegmentTemplate element with $Number$ or $Time$ identifier is used to specify the Segment Information, all the media segments may have to be in the same directory on the server. This limitation creates an issue when there are restrictions on the number of media segments (e.g., files) that can be stored in a directory on a server. As noted previously, in typical real world scenarios, there can be CDN Origin servers and/or storage servers having limitations on the number of files that can be stored in a single directory, and this situation is especially problematic when a media content is prepared for the segmented delivery that requires the segments to be placed in more than one directory on these servers. In addition, in order to manage a large set of segmented files for a large of set of media files, there may be administration policy restrictions on the number of files per directory. Accordingly, it should be appreciated that with the SegmentTemplate element as currently defined in the DASH specification it is not possible to specify the Segment Information to deliver segments from different directories of a server.

For purposes of the present patent application, embodiments are provided wherein certain MPD extensions are advantageously set forth with respect to multi-directory storage and signaling of directory limit parametric information. Broadly, embodiments are directed to a system and method to store media segments on a media storage server (CDN Origin or HTTP server) in such a way that the media segments of a content program are stored in different directories based on a Directory-Limit value (i.e., a limit on number of files stored or uploaded in a directory of a file system associated with the server), which can be accessed by various ABR clients including HLS clients, HDS clients, DASH clients, etc., that are operable to receive metadata files containing explicitly or directly referenced URLs in segment lists for all the media segments. Further, the Directory-Limit parametric information may be signaled in the DASH MPD SegmentTemplate element for additional or alternative embodiments so that a suitably configured DASH client can construct the appropriate segment URLs to access the media segments that are stored in multiple directories of the server. As the SegmentTemplate element provides an efficient way in DASH to deliver the media segments, it should be appreciated that example embodiments set forth herein advantageously extend the SegmentTemplate element to provide this efficiency to deliver media segments from multiple directories when a Directory Limit value is applied to store the segments on a server.

Yet further embodiments relate to a system, apparatus or infrastructure comprising a DASH packager, associated upload/storage server(s) (e.g., CDN Origin/HTTP servers), DASH MPD manifest and DASH client(s) to playback media segments of a content program that are generated by the packager and stored on the server when a directory limit is applied. The media segments may be stored in such a way that these segments in the different directories can be expressed by the extended directory limit parametric information in the SegmentTemplate element as set forth in FIG. 3A. With the extended information signaled in the SegmentTemplate element, the DASH client is therefore suitably configured or enabled to construct the appropriate segment URLs to access the media segments stored across multiple directories.

When multiple media segments are present and a SegmentTemplate element is used to specify the Segment Information, the SegmentTemplate may use the multiple segment base information as provided in the DASH specification 5.3.9.2.2; Table 12, by way of an element or sub-element referred to as MultipleSegmentBaseInformation, which includes @startNumber and @duration attributes, wherein the @startNumber attribute specifies the number of the first Media Segment in a Representation in a Period. In accordance with the teachings of the present patent application, the MultipleSegmentBaseInformation element may be extended to include directory limit parametric information, value(s) or other indicia. In one embodiment, this information comprises an attribute referred to as @dirLimit that may be added, e.g., in optional manner, to extend the MultipleSegmentBaseInformation element. It should be noted that the addition of this optional attribute is not limited to just MultipleSegmentBaseInformation, as it can be added to any other elements that are used to provide the Segment Information as specified in the DASH specification.

In one implementation, the @dirLimit attribute may be configured to specify the maximum number of media segments that can be stored or uploaded in a directory of a server's file system. If @dirLimit value is 0, an example embodiment may determine that Directory Limit is not enabled, indicating that there is no maximum limit to the number of media segments that can be stored in a directory. In one example arrangement, a @dirLimit value of 0 may be provided as a default configuration (i.e., directory limit is not enabled). When @dirLimit value is >0, directory limit is enabled and the value may be used to generate the Segment Information using either $Number$ or $Time$ identifier as will be set forth below. In one embodiment, it should be noted that the @dirLimit attribute may be applied only for @media attribute of the SegmentTemplate element.

Yet another MPD extension is provided according to the teachings of the present patent application by way of a new identifier contained in or associated with the SegmentTemplate@media attribute, which may typically contain one of the identifiers as listed in the DASH Specification at Table 16. With respect to URL construction, the identifiers are replaced by a corresponding substitution parameter defined in Table 16 of the DASH specification. A new identifier, $DirLimit$, is added to extend the list of identifiers in Table 16, which may be used in conjunction with the $Number$ identifier for substitution (referred to as number-based substitution schema for URL construction) or the $Time$ identifier for substitution (referred to as time-based substitution schema for URL construction). In an embodiment involving $DirLimit$ identifier substitution when used with $Number$ identifier, the $DirLimit$ identifier may be substituted with a value derived from the following example algorithm or process:

```
If (($Number$ modulo @dirLimit) > 0) then
        $DirLimit$ = $Number$ div @dirLimit
    else
        $DirLimit$ = ($Number$ -1) div @dirLimit
```

In another embodiment involving $DirLimit$ identifier substitution when used with $Time$ identifier, the $DirLimit$ identifier may be substituted with a value derived from the following algorithm or process:

```
If $Time$ == 0 then
        $DirLimit$ = 0
    else
        $DirLimit$ = ($Time$ div @duration) div @dirLimit
```

Table 16 of the DASH specification may therefore be extended or otherwise modified to include the new $DirLimit$ identifier for URL constructions based on the @dirLimit attribute value as set forth in the following table:

TABLE A

| $Identifier$ | Substitution Parameter | Format |
|---|---|---|
| $DirLimit$ | $DirLimit$ identifier substitution when used with $Time$ identifier: The $DirLimit$ identifier may be substituted with a value derived from the following algorithm:     If (($Number$ modulo @dirLimit) > 0) then         $DirLimit$ = $Number$ div @dirLimit       else         $DirLimit$ = ($Number$ −1) div @dirLimit $DirLimit$ identifier substitution when used with $Time$ identifier: The $DirLimit$ identifier may be substituted with a value derived from the following algorithm:     If $Time$ == 0 then         $DirLimit$ = 0     else         $DirLimit$ = ($Time$ div @duration) div @dirLimit | The format tag may be present. If no format tag is present, a default format tag with width=1 may be used. |

As noted above, in an example embodiment, the $DirLimit$ identifier may be used only when the SegmentTemplate element is used with the $Number$ or $Time$ identifier. Set forth below are examples of its usage with the @media attribute:

@media="$RepresentationId$/eng/$DirLimit$/seg-$Number$.ts

@media="video/$DirLimit%5d$/segment-$Number%5d%$.ts

@media="video/$DirLimit%5d$/segment-$Time$.ts

@media="$RepresentationId$/eng/$DirLimit$/seg-$Time$.ts

Referring back to the ABR streaming network environment 100 of FIG. 1, packager 112 may be configured with a DirectoryLimit value as part of its upload server configuration or CDN server upload profile. As described previously, the upload server can be any storage server—HTTP server or CDN Origin server 116. When a media content (e.g., from sources 140A/140B) is prepared for segmented delivery, ABR/DASH packager 112 uses DirectoryLimit value into account to upload the segments to appropriate directory(ies) on the server(s) at the locations referenced by the URLs constructed according to the teachings set forth hereinabove. For example, $DirLimit$ may result in a directory name (illustratively, with a number like 0, 1, 2, etc.) for the segments directory, with each media segment uploaded to a storage location referenced by the constructed URL based on the directory limit parametrics.

One skilled in the art will recognize that in one implementation, the constructed URLs may comprise absolute URLs, relative URLs, fully qualified URLs, and/or virtual URLs that can be resolved to fully qualified physical URLs, or any combination thereof, depending on storage/database implementation, resource organization, level of virtualization of resources, and the like. Whereas an absolute URL contains all the information necessary to locate a resource (e.g., media segment), a relative URL may be configured to locate a resource using an absolute URL as a starting point. In effect, the complete or fully qualified URL of a resource is specified by concatenating the absolute and relative URLs. In one arrangement, an absolute URL may use the following format: scheme://server/path/resource, where scheme specifies how the resource is to be accessed (e.g., HTTP), server specifies the name of the computer where the resource is located, path specifies the sequence of directories leading to the resource target, and resource typically indicates the name of a file. In one arrangement, the resource may be a simple file, containing a single binary stream of bytes, or a structured document, containing one or more storages and binary streams of bytes.

As a further variation, the DASH packager 112 may be configured to generate an MPD with the SegmentTemplate with $Number$ or $Time$ and $DirLimit$ identifiers specified for the @media attribute as defined in the $DirLimit$ usage examples above. In addition, the @dirLimit attribute value equal to DirectoryLimit value configured for the server may be signaled in the MPD, thereby enabling a DASH client with respect to the Segment Information for the segments and segment URL construction using both @dirLimit attribute value and $DirLimit$ as specified above. Taking reference now to FIG. 3B, shown therein is an example segment information list 300B having media resource locators, i.e., URLs, constructed by a DASH client device according to an embodiment of the present invention. Reference numeral 312 refers to a segment information element with respect to an initialization segment having a corresponding URL, followed by media segment metadata portions 314-1 to 314-N corresponding to N media segments, each metadata portion including a URL to the corresponding media segment as well as associated timing parameter information.

In respect of non-DASH clients that can receive metadata information via suitable manifests having explicitly referenced URLs in a segment list, appropriate playlist files may be prepared based on the directory limit configuration provided for the server upload profile of the packager node. For example, in an HLS environment, a suitable m3u8 file may be prepared using such directory limit value.

Figure 2:
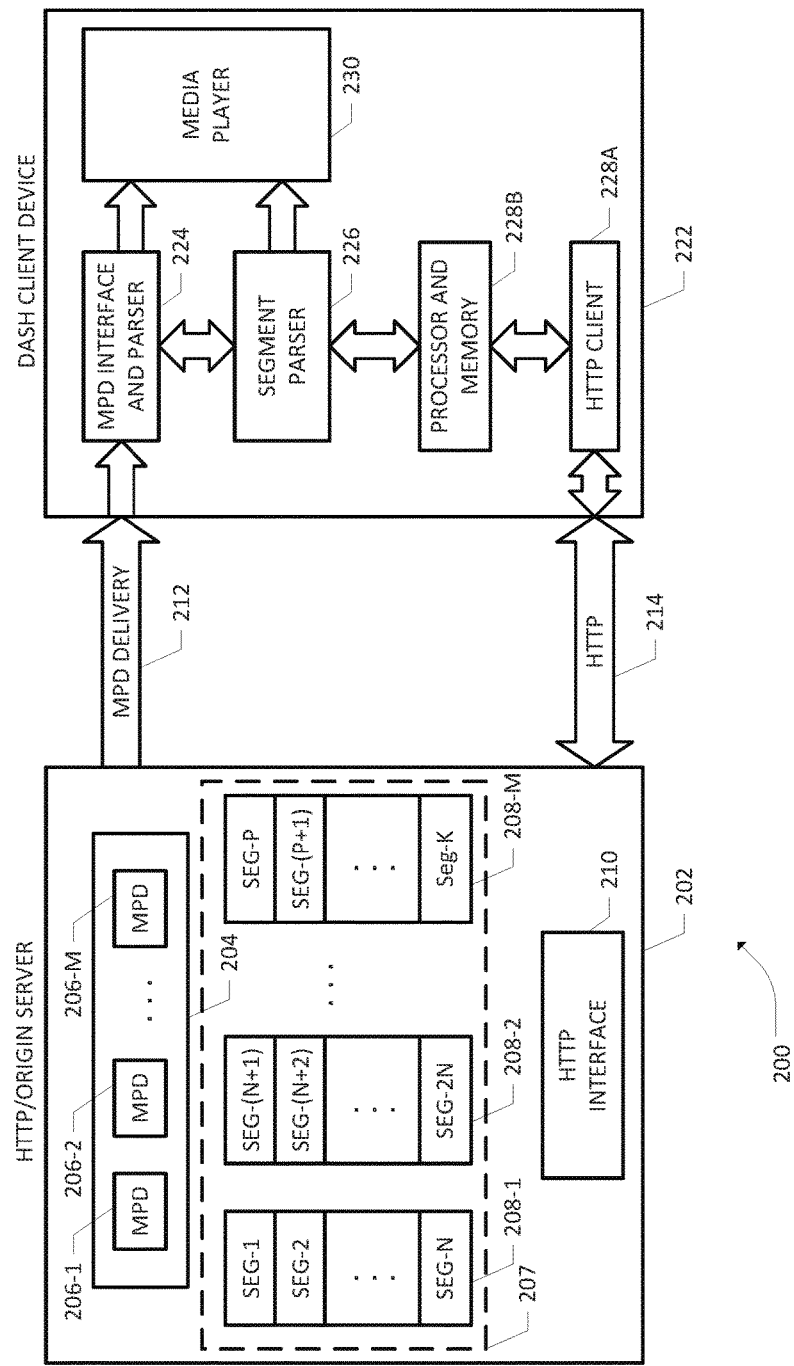
FIG. 2 depicts an example DASH server-client architecture having multi-directory storage of media segments according to an embodiment for purposes of the present patent application.

Turning to FIG. 2, depicted therein is an example DASH server-client architecture 200 having multi-directory storage of media segments according to an embodiment for purposes of the present patent application. Preferably configured as a live/TS/VOD multimedia content server, DASH server 202 is operative to cooperate with media capture, encoding, and segment processing as set forth above in reference to FIG. 1, wherein a live/TS/VOD multimedia program content may be partitioned into a plurality of segments whose manifest/metadata file information may be provided in one or more hierarchically-organized MPD documents as set forth above. Reference numeral 204 collectively refers to one or more MPDs 206-1 to 206-M pertaining to one or more media programs or content adapted to be streamed to client devices. The actual content of an example multimedia asset is illustratively shown as groups or directories of segments 208-1 to 208-M as part of a file system 207, wherein the segments in one or more representations (i.e., the same multimedia content in multiple versions encoded at different resolutions or bitrates) are stored in individual directories based on a directory size limit (e.g., N files), which may be transmitted to an example client device 222 in a streaming session effectuated via HTTP interface 210 pursuant to receiving suitably constructed segment URLs. MPDs 206-1 to 206-M containing the directory limit parametric information may be delivered or otherwise provided to the client device 222 via a number of transports, e.g., using HTTP, email, broadcast, etc., as exemplified by path 212, some of which may be in an out-of-band mechanism relative to the media transport itself. An MPD delivery interface and parser 224 is provided with the client device 222 for parsing the MPD metadata. By parsing the MPD metadata information, a DASH client application running on the client device 222 is operative to learn about the program timing, media/ content availability, media types, resolutions, range of bandwidths, and the existence of various encoded versions, accessibility features, media locations on the network, any required digital rights management (DRM), and other content characteristics, in addition to information relating to multi-segment storage of the content signaled via the SegmentTemplate element. A segment parser 226, HTTP client 228A and a media player 230 may be provided as part of the client device 222 for facilitating media streaming and rendering (in conjunction with the MPD parser 224) by constructing appropriate segment URLs for segments stored at the server 202 (e.g., segment directories 208-1 to 208-M) under control of one or more processors and associated persistent memory 228B having program instructions therefor. As described hereinabove, the program instructions may be configured to execute either a $Number$-based substitution or a $Time$-based substitution for constructing the URLs based on the received directory limit parametrics.

It should be recognized that although the file system 207 is shown as being associated with a single server 202, embodiments of the present invention are not necessarily limited thereto. Accordingly, a distributed file system across multiple servers and/or including virtualized or cloud-based storage may also be provided within the scope of the teachings herein for storage of live media, time shift media, place shift media, VOD media, cloud/network DVR media, and the like. An example file system associated with the media server(s) may therefore comprise a directory tree structure that maps to one or more physical storage structures or schemes, one or more virtual storage structures or schemes, or a combination of storage schemes and/or structures. In an example CDN environment, storage architectures may take on a variety of implementations such as, e.g., Software-Defined Storage (SDS), data attached storage (DAS), Just A Bunch of Disks (JBODs), virtualized storage on bare metal, virtualized storage on virtual block devices, and the like.

Figure 4A:
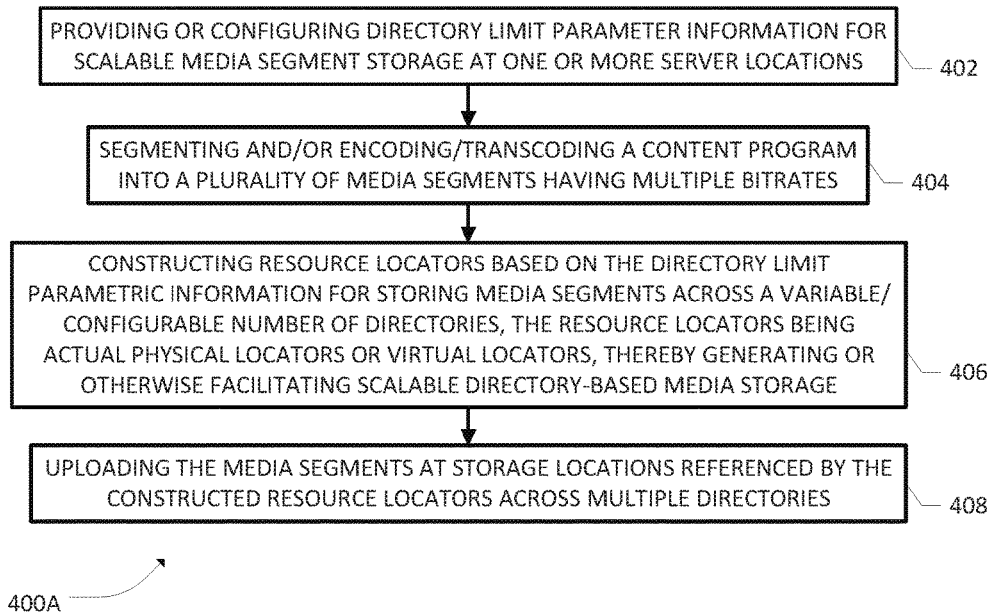
FIGS. 4A and 4B depict flowcharts of various blocks, steps and/or acts that may be (re)combined in one or more arrangements that illustrate one or more embodiments of the present patent disclosure for facilitating multi-directory storage of media segments in an ABR streaming network.
Figure 4B:
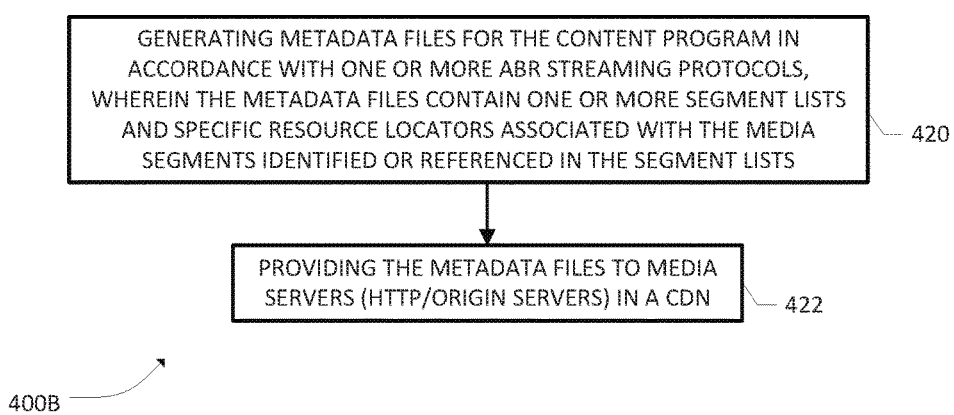

FIGS. 4A and 4B depict flowcharts of various blocks, steps and/or acts that may be (re)combined in one or more arrangements that illustrate one or more embodiments of the present patent disclosure for facilitating multi-directory storage of media segments in an ABR streaming network. Example media storage and processing methodology, generally set forth at 400A, involves providing or configuring directory limit parameter information for a packager node to facilitate scalable media segment storage at one or more server locations, e.g., by specifying configurable directory sizes (block 402). At block 404, a content program may be segmented and/or encoded/transcoded into a plurality of media segments having multiple bitrates. At block 406, resource locators based on the directory limit parametric information may be constructed for storing media segments across a variable/configurable number of directories, wherein the resource locators may comprise actual physical locators or virtual locators that reference storage locations in a scalable directory-based media storage/resource space. At block 408, the media segments may be uploaded to or stored at storage locations referenced by the constructed resource locators across multiple directories. In a further embodiment, example process 400B sets forth metadata generation that may be used in DASH or non-DASH environments involving explicit/directing referencing of segments in a segment list. At block 420, suitable metadata files for a content program may be generated in accordance with one or more ABR streaming protocols (e.g., m3u8 playlist files for HLS), wherein the metadata files contain one or more segment lists and specific resource locators (e.g., fully qualified URLs) associated with the media segments identified or referenced in the segment lists. At block 422, the metadata files are provided or stored to media servers (e.g., HTTP/Origin servers) disposed in a CDN.

Figure 5A:
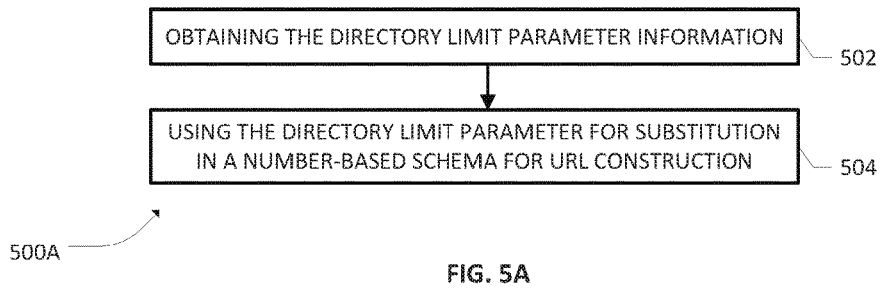
FIGS. 5A and 5B depict flowcharts of example URL construction schemes that may be used by a packager node, a client device, or both, in accordance with one or more embodiments of the present patent disclosure.
Figure 5B:
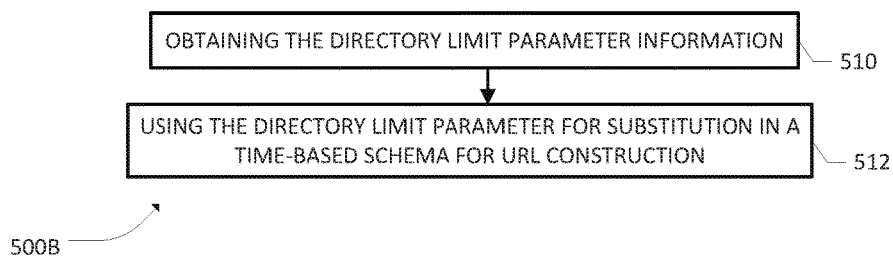

FIGS. 5A and 5B depict flowcharts of example URL construction schemes that may be used by a packager node, a client device, or both, in accordance with one or more embodiments of the present patent disclosure. Reference numeral 500A refers to a number-based substitution schema set forth in accordance with a modified/extended SegmentTemplate element described in detail hereinabove. At block 502, configurable directory limit parameter information is obtained or otherwise provided. At block 504, the directory limit parameter information is used for identifier substitution according to the extended/modified Table 16 of the DASH specification described above for constructing valid URLs. In similar fashion, a time-based substitution schema 500B involves obtaining or otherwise providing configurable directory limit parameter information (block 510) and using that information (block 512) for identifier substitution according to the extended/modified Table 16 of the DASH specification.

Figure 6:
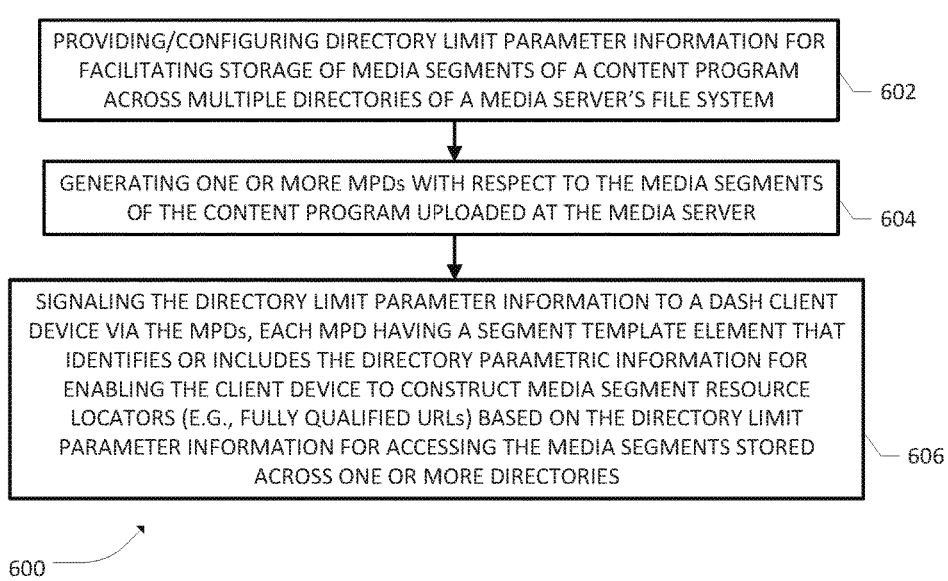
FIG. 6 depicts a flowchart of various blocks, steps and/or acts that may take place at a DASH packager node according to an embodiment of the present invention.

FIG. 6 depicts a flowchart of various blocks, steps and/or acts that may take place as part of a packaging process 600 at a DASH packager node according to an embodiment of the present invention. At block 602, suitable directory limit parameter information is configured or otherwise provided for facilitating storage of media segments of a content program across multiple directories of a media server's file system. At block 604, one or more MPDs may be generated with respect to the media segments of the content program uploaded at the media server. At block 606, the directory limit parameter information may be signaled to a DASH client device via a modified element of the MPD(s), wherein each MPD is provided with a segment template element that identifies or includes the directory parametric information for enabling the DASH client device to construct media segment resource locators (e.g., fully qualified URLs) based on the directory limit parameter information for accessing the media segments stored across one or more directories as described in detail hereinabove.

Figure 7:
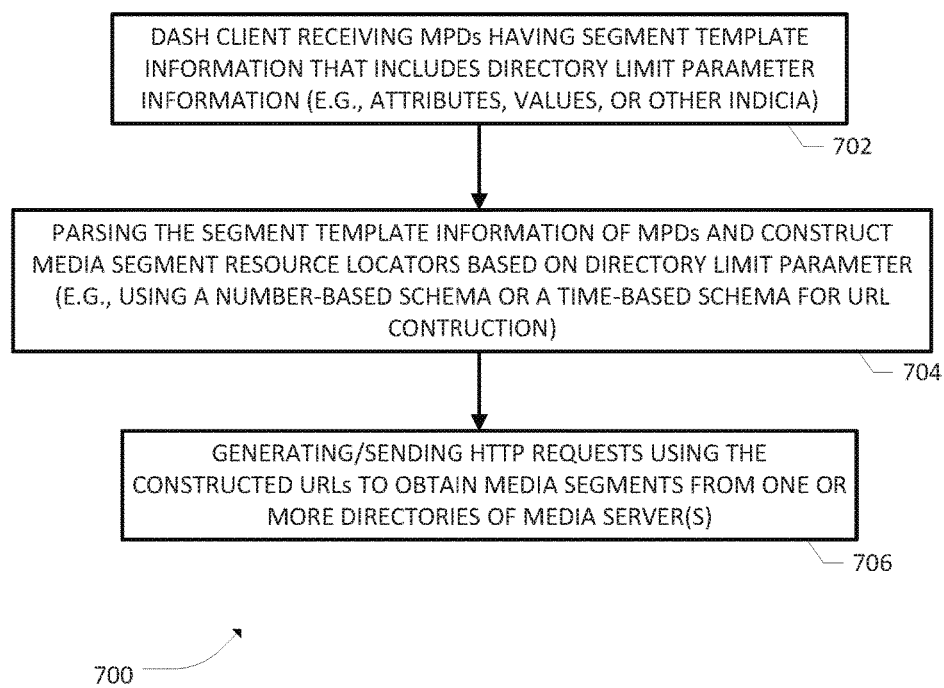
FIG. 7 depicts a flowchart of various blocks, steps and/or acts that may take place at a DASH client node according to an embodiment of the present invention.

FIG. 7 depicts a flowchart of various blocks, steps and/or acts that may take place as part of a process 700 operable at a DASH client node according to an embodiment of the present invention. At block 702, a DASH client receives MPDs having segment template information that includes directory limit parameter information (e.g., attributes, values, or other indicia). A parser associated with the DASH client is operative for parsing the segment template information of MPDs. Using the parsed metadata, valid media segment resource locators may be constructed based on directory limit parameter information (e.g., using a number-based schema or a time-based schema for URL construction) as set forth above (block 704). The client process 700 may thereafter generate and transmit appropriate HTTP requests (e.g., http get requests) using the constructed URLs to obtain media segments from one or more directory locations of the media server (block 706). In a further variation, a conventional DASH client device may be configured to determine whether there is directory limit signaling in an MPD and if so, ignore the modified segment template elements of the MPD and process URL construction according to the current DASH specification.

Figure 8:
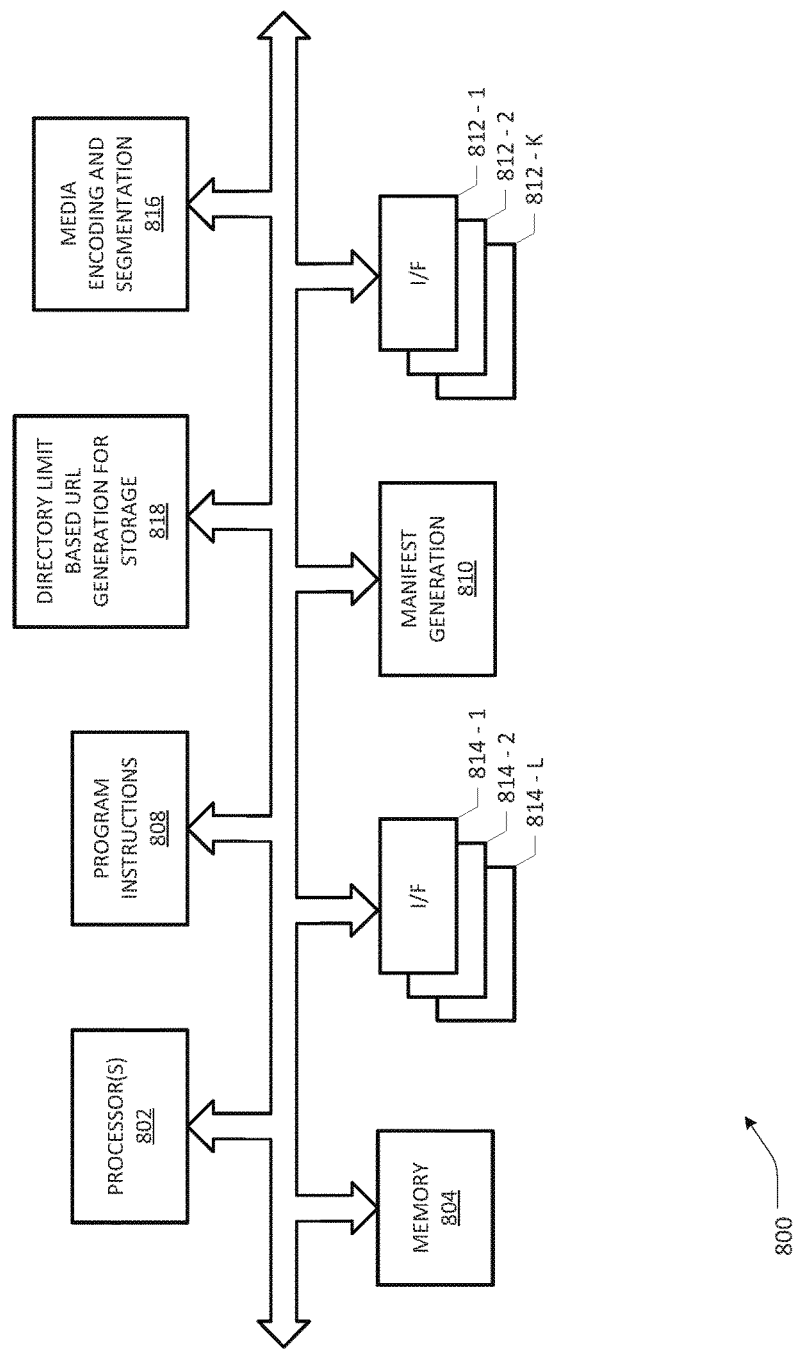
FIG. 8 is a block diagram of an apparatus, subsystem or one or more network components that may be configured as a media preparation and/or packaging node in accordance with an embodiment of the present invention.

FIG. 8 is a block diagram of an apparatus, subsystem or one or more network components that may be configured as a media preparation node and/or a packager node, e.g., nodes 106/112 depicted in FIG. 1, in accordance with an embodiment of the present invention. Depending on the implementation and/or network architecture of an ABR communications network, apparatus 800 may be configured in different ways suitable for operation at multiple hierarchical levels, e.g., at a super headend node, regional headend node, video hub office node, ABR origin server node, central or regional or edge distribution node in a CDN, etc., on the basis of where the content sources are disposed. Accordingly, suitable network interfaces, e.g., I/F 814-1 to 814-L, operative for effectuating communications with other upstream network infrastructure elements and databases (e.g., source feeds, databases for storing encoded media fragments, metadata/MPD files, etc.) as well as interfaces 812-1 to 812-K for effectuating communications with any downstream network infrastructure elements and databases (e.g., HTTP/Origin servers, cloud-based storage platforms, etc.) may be provided as part of the network apparatus 800. One or more processors 802 may be provided as part of a suitable computer architecture for effectuating overcall control of the apparatus 800, which processor(s) 802 may be configured to execute various program instructions stored in appropriate memory modules or blocks, e.g., persistent memory 804 as well as program instructions 808, including additional modules or blocks specific to encoding/transcoding, media segmentation, MPD generation, etc. By way of illustration, a directory-limit-based URL generation block 818 may comprise suitable hardware and software components for effectuating URL construction processes as discussed previously. A media segmentation and encoding block 816 is operative to generate multi-bitrate representations of source media, for which suitable metadata files may be generated by a manifest/MPD generator 810. As noted previously, directory limit parametric information may be configured based on a number of policies and rules, which information may be provided as part of an upload profile executed on the network apparatus 800.

Based upon the foregoing Detailed Description, it should be appreciated that one or more embodiments of the present disclosure can be advantageously implemented in a variety of ABR streaming environments that may include legacy DASH client applications and/or custom/enhanced DASH client applications for facilitating multi-directory storage at various levels of media packaging/preparation in an example network.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

One skilled in the art will further recognize that various apparatuses, subsystems, functionalities/applications and/or one or more network elements as well as the underlying network infrastructures set forth above for facilitating scalable media storage and directory limit signaling may be architected in a virtualized environment according to a network function virtualization (NFV) architecture in additional or alternative embodiments of the present patent disclosure. For instance, various physical resources, services, applications and functions set forth herein above with respect to an example ABR streaming network environment may be provided as virtual appliances, machines or functions, wherein the resources and applications are virtualized into suitable virtual network functions (VNFs) or virtual network elements (VNEs) via a suitable virtualization layer. In such embodiments, resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Accordingly, at least a portion of an example network architecture disclosed herein may be virtualized as set forth above and architected in a cloud-computing environment comprising a shared pool of configurable virtual resources. Various pieces of software, e.g., media preparation operations, segmentation/encoding, MPD generation and packaging, subscriber management, etc., as well as platforms and infrastructure of a packager network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operating at a user equipment (UE) device configured to engage in an adaptive bitrate (ABR) streaming session via Dynamic Adaptive Streaming over HTTP (DASH), the method comprising:
   receiving one or more media presentation description documents (MPDs) with respect to a content program, each MPD having a segment template element that identifies one or more directory limit indicia that indicate a size corresponding to a maximum number of media segments stored in each directory of a plurality of directories of a single file system associated with at least one media server across which the content program comprising a plurality of segments is stored;
   parsing the segment template element of the one or more MPDs;
   constructing resource locators based on the one or more directory limit indicia provided in the MPDs, the resource locators configured for accessing media segments of the content program from the plurality of directories of the single file system; and
   generating HTTP requests using the constructed resource locators to obtain media segments of the content program from the plurality of directories of the single file system.

2. The method as recited in claim 1, wherein the resource locators are constructed based on a value derived from a number-based schema used in the MPDs in conjunction with the one or more directory limit indicia.

3. The method as recited in claim 1, wherein the resource locators are constructed based on a value derived from a time-based schema used in the MPDs in conjunction with the one or more directory limit indicia.

4. The method as recited in claim 1, wherein the content program comprises one of a Video-On-Demand (VOD) program, a catch-up asset generated based on time-shifting of a live program, and a network personal video recorder (NPVR) asset.

5. The method as recited in claim 1, wherein the one or more directory limit indicia comprise a @dirLimit attribute operative for generating a Segment Information parameter in accordance with ISO/IEC 23009-1 specification.

6. The method as recited in claim 2, wherein the @dirLimit attribute is used for deriving a value for a $DirLimit$ identifier provided for the segment template's @media attribute in constructing the resource locators based on one of a $Number$ identifier and a $Time$ identifier associated with the segment template element.

7. The method as recited in claim 2, wherein a value of 0 is provided for the @dirLimit attribute as a default value operative to indicate that there is no maximum limit to number of media segments that can be stored in a directory of the single file system.

8. A user equipment (UE) device configured to engage in an adaptive bitrate (ABR) streaming session via Dynamic Adaptive Streaming over HTTP (DASH), the UE device comprising:
   one or more processors;
   a DASH media player operative to play media segments received in the ABR streaming session via DASH; and
   a persistent memory coupled to the one or more processors and the DASH media player, the persistent memory having program instructions for performing the following:
   receive one or more media presentation description documents (MPDs) with respect to a content program to be played by the DASH media player, each MPD having a segment template element that identifies one or more directory limit indicia that indicate a size corresponding to a maximum number of media segments stored in each directory of a plurality of directories of a single file system associated with at least one media server across which the content program comprising a plurality of segments is stored;

parse the segment template element of the one or more MPDs;

construct resource locators based on the one or more directory limit indicia provided in the MPDs, the resource locators configured for accessing media segments of the content program from the plurality of directories of the single file system; and generate HTTP requests using the constructed resource locators to obtain media segments of the content program from the plurality of directories of the single file system.

9. The UE device as recited in claim 8, wherein the resource locators are constructed based on a value derived from a number-based schema used in the MPDs in conjunction with the one or more directory limit indicia.

10. The UE device as recited in claim 8, wherein the resource locators are constructed based on a value derived from a time-based schema used in the MPDs in conjunction with the one or more directory limit indicia.

11. The UE device as recited in claim 8, wherein the content program comprises one of a Video-On-Demand (VOD) program, a catch-up asset generated based on time-shifting of a live program, and a network personal video recorder (NPVR) asset.

12. The UE device as recited in claim 8, wherein the one or more directory limit indicia comprise a @dirLimit attribute operative for generating a Segment Information parameter in accordance with ISO/IEC 23009-1 specification.

13. The UE device as recited in claim 12, wherein the program instructions further include instructions for using the @dirLimit attribute in deriving a value for a $DirLimit$ identifier provided for the segment template's @media attribute for constructing the resource locators based on one of a $Number$ identifier and a $Time$ identifier associated with the segment template element.

14. The UE device as recited in claim 12, wherein the program instructions further include instructions for determining, responsive to a value of 0 provided for the @dirLimit attribute as a default value, that there is no maximum limit to number of media segments stored in a directory of the single file system.

15. A method operating at a Dynamic Adaptive Streaming over HTTP (DASH) network node, the method comprising:
    partitioning a content program into a plurality of media segments;
    storing the plurality of media segments across multiple directories of a single file system associated with at least one media server;
    generating one or more media presentation description documents (MPDs) with respect to the media segments of the content program stored across the multiple directories of the single file system, wherein each MPD includes a segment template element that identifies one or more directory limit indicia operating to indicate a size corresponding to a maximum number of media segments stored in each directory;
    providing the MPDs including the one or more directory limit indicia to a DASH client device; and
    receiving HTTP requests from the DASH client device with respect to the content program, wherein the HTTP requests are based on resource locators constructed responsive to the one or more directory limit indicia provided in the MPDs, the resource locators configured for accessing media segments of the content program from the multiple directories of the single file system.

16. The method as recited in claim 15, wherein the one or more directory limit indicia comprise a @dirLimit attribute operative for generating a Segment Information parameter in accordance with ISO/IEC 23009-1 specification.

17. The method as recited in claim 15, wherein the one or more directory limit indicia are configured based on at least one of a storage administration policy, size of the content program and a content provider's policy.

18. A Dynamic Adaptive Streaming over HTTP (DASH) network node, comprising:
    one or more processors;
    a network interface for receiving media from one or more sources; and
    one or more persistent memories coupled to the one or more processors and the network interface, the persistent memories having program instructions for performing the following:
    partitioning a content program into a plurality of media segments;
    storing the plurality of media segments across multiple directories of a single file system associated with at least one media server;
    generating one or more media presentation description documents (MPDs) with respect to the media segments of the content program stored across the multiple directories of the media server file system, wherein each MPD includes a segment template element that identifies one or more directory limit indicia operating to indicate a size corresponding to a maximum number of media segments stored in each directory;
    providing the MPDs including the one or more directory limit indicia to a DASH client device; and
    receiving HTTP requests from the DASH client device with respect to the content program, wherein the HTTP requests are based on resource locators constructed responsive to the one or more directory limit indicia provided in the MPDs, the resource locators configured for accessing media segments of the content program from the multiple directories of the single file system.

19. The DASH network node as recited in claim 18, wherein the one or more directory limit indicia comprise a @dirLimit attribute operative for generating a Segment Information parameter in accordance with ISO/IEC 23009-1 specification.

20. The DASH network node as recited in claim 18, wherein the one or more directory limit indicia are configured based on at least one of a storage administration policy, size of the content program and a content provider's policy.

21. A user equipment (UE) device configured to engage in an adaptive bitrate (ABR) streaming session via Dynamic Adaptive Streaming over HTTP (DASH), the UE device comprising:
    one or more processors;
    a DASH media player operative to play media segments received in the ABR streaming session via DASH; and
    a persistent memory coupled to the one or more processors and the DASH media player, the persistent memory having program instructions for performing the following:
    receive one or more media presentation description documents (MPDs) with respect to a content program to be played by the DASH media player, each MPD having a segment template element that identifies one or more directory limit indicia, wherein the content program is partitioned into a plurality of segments that are stored across multiple directories of a media server file system, the one or more directory limit indicia operating to indicate a maximum number of media segments stored in each directory;

parse the segment template element of the one or more MPDs;

construct resource locators based on the one or more directory limit indicia provided in the MPDs, the resource locators configured for accessing media segments of the content program from the multiple directories of the media server file system; and generate HTTP requests using the constructed resource locators to obtain media segments of the content program from the multiple directories of the media server file system, wherein the one or more directory limit indicia comprises a @dirLimit attribute with a value of 0 as a default value operative to indicate that there is no maximum limit to number of media segments that can be stored in a directory of the media server file system.

22. A media streaming network node, comprising: one or more processors;

a network interface for receiving media from one or more sources; and one or more persistent memories coupled to the one or more processors and the network interface, the persistent memories having program instructions for performing the following:

partitioning a content program into a plurality of media segments;

storing the plurality of media segments across multiple directories of a media server file system;

generating one or more media presentation description documents (MPDs) with respect to the media segments of the content program stored across the multiple directories of the media server file system, wherein each MPD includes a segment template element that identifies one or more directory limit indicia operating to indicate a maximum number of media segments stored in each directory;

providing the MPDs including the one or more directory limit indicia to a DASH client device; and receiving HTTP requests from the DASH client device with respect to the content program, wherein the HTTP requests are based on resource locators constructed responsive to the one or more directory limit indicia provided in the MPDs, the resource locators configured for efficiently accessing media segments of the content program from the multiple directories of the media server file system, wherein the one or more directory limit indicia comprises a @dirLimit attribute with a value of 0 as a default value operative to indicate that there is no maximum limit to number of media segments that can be stored in a directory of the media server file system.

* * * * *